United States Patent
Das et al.

(10) Patent No.: US 10,068,045 B1
(45) Date of Patent: Sep. 4, 2018

(54) PROGRAMMABLE LOGIC DEVICE DESIGN IMPLEMENTATIONS WITH MULTIPLEXER TRANSFORMATIONS

(71) Applicant: Xilinx, Inc., San Jose, CA (US)

(72) Inventors: Sabyasachi Das, San Jose, CA (US); Chiwei Huang, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/374,994

(22) Filed: Dec. 9, 2016

(51) Int. Cl.
*G06F 17/50* (2006.01)

(52) U.S. Cl.
CPC ........ *G06F 17/5054* (2013.01); *G06F 17/505* (2013.01); *G06F 17/5031* (2013.01); *G06F 2217/06* (2013.01)

(58) Field of Classification Search
CPC ........................... G06F 17/5031; G06F 17/505
USPC ........................................ 716/103, 116, 117
See application file for complete search history.

(56) References Cited

U.S. PATENT DOCUMENTS

| | | | | |
|---|---|---|---|---|
| 6,118,300 A * | 9/2000 | Wittig et al. | .... | H03K 19/17736 326/41 |
| 6,489,830 B1 * | 12/2002 | Kostarnov | ........... | H03K 17/005 327/403 |
| 6,505,337 B1 * | 1/2003 | Wittig et al. | ...... | H03K 19/1737 326/38 |
| 6,625,797 B1 | 9/2003 | Edwards et al. | | |
| 6,943,580 B2 * | 9/2005 | Lewis et al. | ....... | H03K 19/1737 326/37 |
| 7,073,149 B2 | 7/2006 | Knol et al. | | |
| 7,116,131 B1 * | 10/2006 | Chirania et al. | ............................ | H03K 19/17728 326/113 |
| 7,117,473 B1 | 10/2006 | Knol et al. | | |
| 7,120,892 B1 | 10/2006 | Knol et al. | | |
| 7,146,595 B2 | 12/2006 | Knol et al. | | |
| 7,418,686 B1 | 8/2008 | Knol et al. | | |
| 7,451,420 B1 * | 11/2008 | Reynolds et al. | .. | G06F 17/5054 716/128 |
| 7,486,110 B2 * | 2/2009 | Bhatti et al. | ..... | H03K 19/17728 326/38 |
| 7,590,965 B1 | 9/2009 | Ingoldby et al. | | |
| 7,600,204 B1 | 10/2009 | Chirania et al. | | |
| 7,735,045 B1 * | 6/2010 | Van Mau et al. | ... | G06F 17/5054 714/725 |
| 7,979,835 B1 | 7/2011 | Schumacher et al. | | |

(Continued)

OTHER PUBLICATIONS

Anderson et al., "Raising FPGA Logic Density Through Synthesis-Inspired Architecture", Mar. 2012, IEEE Transactions on Very Large Scale Integration (VLSI) Systems, vol. 20, No. 3, pp. 537-550.*

(Continued)

*Primary Examiner* — Sun Lin
(74) *Attorney, Agent, or Firm* — LeRoy D. Maunu

(57) ABSTRACT

A programmable logic design is generated for a programmable logic device (PLD) containing configurable logic blocks (CLBs) each having a plurality of multiplexers and look-up-table (LUT) circuits. A first subset of multiplexers are identified from the plurality of multiplexers based upon an analysis of design definitions for input signals of the plurality of multiplexers. The first subset of multiplexers are transformed into LUT logic. Configuration data is generated that is designed to be loaded into the PLD to configure the CLBs. The configuration data includes the LUT logic.

20 Claims, 6 Drawing Sheets

(56) References Cited

U.S. PATENT DOCUMENTS

| | | |
|---|---|---|
| 8,196,081 B1 | 6/2012 | Arslan et al. |
| 8,984,462 B1 | 3/2015 | Das et al. |
| 9,152,753 B1 * | 10/2015 | Sharma et al. ..... G06F 17/5054 |
| 9,235,660 B1 | 1/2016 | Lu et al. |

OTHER PUBLICATIONS

Altera Netlist Optimization and Physical Synthesis, Quartus II Handbook, version 13.1, Nov. 2013. http://www.altera.com/literature/hb/qts/qts_qii52007.pdf.

Altera Timing Closure and Optimization, Quartus II Handbook, version 13.1, Nov. 2013. http://www.altera.com/literature/hb/qts/qts_qii52007.pdf.

Synopsys Synplify Premier Brochure, 2011. http://www.synopsys.com/Tools/Implementation/FPGAImplementation/Documents/synpremierbrochure.pdf.

UltraScale Architecture Configurable Logic Block user Guide http://www.xilinx.com/Support/documentation/user_guides/ug574-ultrascale-clb.pdf.

* cited by examiner

PROGRAMMABLE LOGIC DEVICE DESIGN IMPLEMENTATIONS WITH MULTIPLEXER TRANSFORMATIONS

TECHNICAL FIELD

The disclosure generally relates to programmable logic devices, and more particularly to programming of programmable logic devices based upon multiplexer functionality.

BACKGROUND

There are a variety of different applications that use programmable logic with hardware multiplexers forming part of the corresponding integrated circuits. Programmable logic devices (PLDs) (including PLDs in the form of System on Chip (SoC) devices) include programmable logic that can be programmed to perform specified logic functions. One type of PLD, the field programmable gate array (FPGA), can include an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect (PCI), PCI Express (PCIe) Ethernet, and so forth. Some PLDs include enough components and functionality to effectively serve as an entire computer system on a single IC chip. Devices with such functionality are sometimes referred to as SoCs.

Programming of PLDs often involves a design flow that begins with a design file(s) that defines the desired functionality of the PLDs. The design might then be synthesized to verify the design file relative to the destination PLD. The output of the synthesis can be a netlist. The netlist can then be used to implement the design using translation, mapping, placement, and routing. The result of these steps can be configuration data (e.g., in the form of bitstream file) that can be uploaded into the PLD for the purposed of configuring the programmable logic. Further steps might include the verification of design constraints, such as timing requirements for various signals. Designs that fail to meet the constraints might be rerun through the prior steps, which can add significant time to the process. Problems with meeting the constraints can be exacerbated by large designs that utilize a high percentage of the available programmable resources. For example, large designs can lead to routing congestion relating to limited programmable resources, such as the multiplexers used to implement configurable logic functions within the CLBs.

These and other problems can be problematic for IC design and their uses.

SUMMARY

A number of implementations are directed toward generating a programmable logic design for a programmable logic device (PLD) containing configurable logic blocks, (CLBs) each having a plurality of multiplexers and look-up-table (LUTs) circuits. A first subset of multiplexers are identified from the plurality of multiplexers based upon an analysis of design definitions for input signals of the plurality of multiplexers. The first subset of multiplexers are transformed into LUT logic. Configuration data can then generated. The configuration data is designed to be loaded into the PLD to configure the CLBs and also includes the LUT logic.

According to implementations of the present disclosure, a system is provided for generating a programmable logic design for a programmable logic device (PLD) containing configurable logic blocks (CLBs), each having a plurality of multiplexers and look-up-table (LUT) circuits. The system includes a processor and a memory arrangement coupled to the processor. The memory arrangement is configured with instructions that, when executed by the processor, cause the processor to perform operations including: identifying a first subset of multiplexers from the plurality of multiplexers based upon an analysis of design definitions for input signals of the plurality of multiplexers; transforming the first subset of multiplexers into LUT logic; and generating configuration data designed to be loaded into the PLD to configure the CLBs, the configuration data including the LUT logic.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

Figure 1:
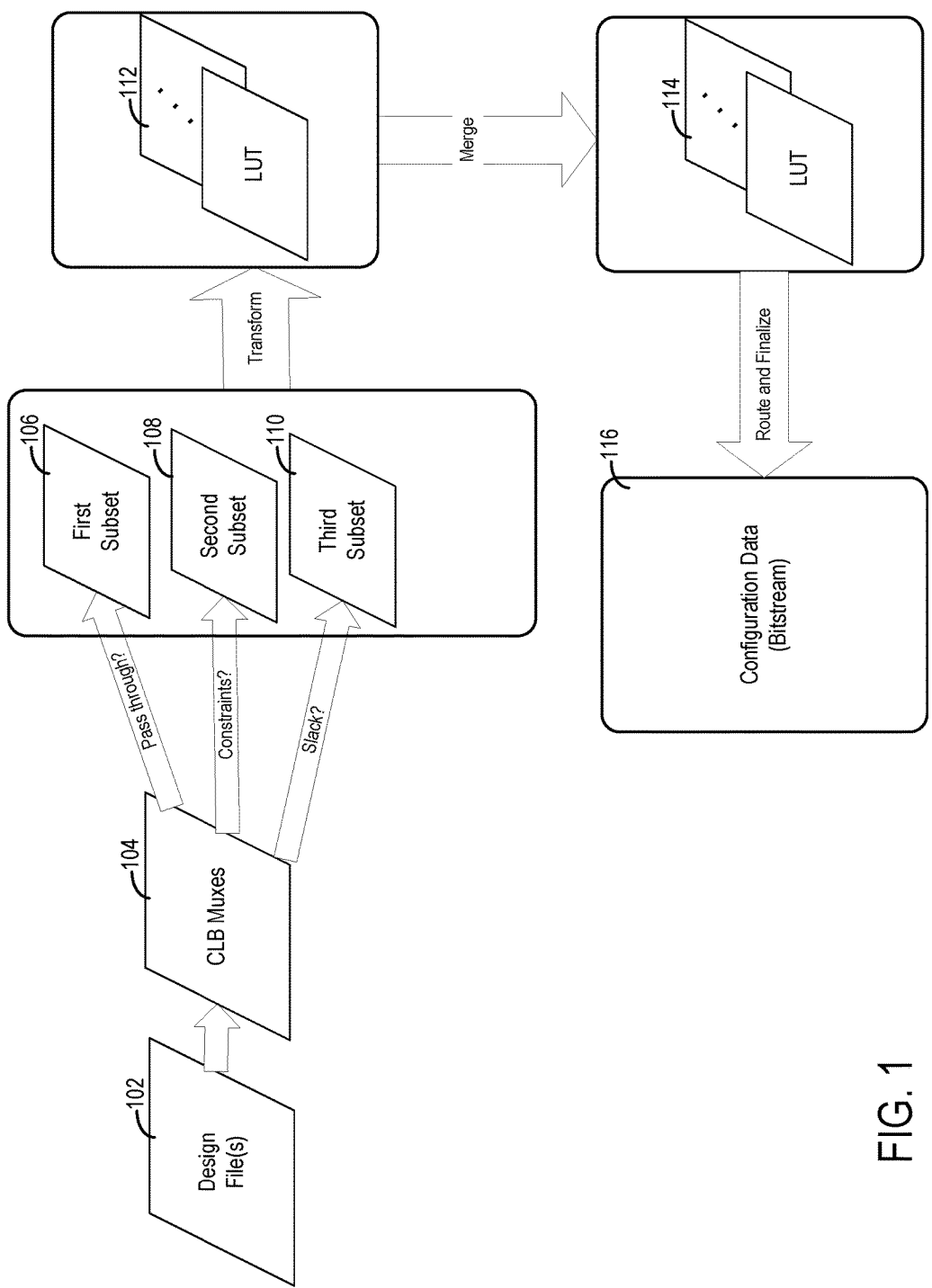
FIG. 1 is a flow diagram that shows a design flow, consistent with implementations of the present disclosure.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Various implementations are directed toward a design flow in which a programmable logic design is generated for loading into a programmable logic device (PLD). The PLD includes configurable logic blocks (CLBs) that each have a plurality of multiplexers. Particular implementations relate to the identification of certain multiplexers as candidates for optimization within the design. At least some of the multiplexers can be transformed into alternative logic structures (e.g., look-up-table (LUT) logic). While not limited thereto, the transformations can be useful for improving signal routing congestion. For example, the multiplexer signaling can include a number of control signals in addition to the input data signals. The number of control signals can increase as the number of multiplexers (and multiplexer levels) increases. Transformations allow for the corresponding multiplexer functionality to a different CLB and to be consolidated or otherwise optimized.

According to certain implementations, the multiplexer identification process can be split into different phases and each phase can generate different subsets of multiplexers for transformation. The identified multiplexers are transformed into LUT logic while maintaining the equivalent logical functionality. In some implementations, the LUT logic can be further optimized by consolidating (merging) logic for multiple transformed multiplexers (and potentially for other LUT logic) into the same LUT block or circuit.

According to some implementations, some of the multiplexers can be identified by comparing threshold levels to design considerations. The threshold levels can be adjusted to adjust how aggressively the system attempts to optimize the design. In some instances, the adjustment can be responsive to the results of the design flow. For example, the design tool might fail to place and route the design due to routing congestion. In response, the threshold levels could be adjusted so that more multiplexers are identified and transformed.

Some implementations are particularly well suited for use with large designs that suffer from routing congestion (e.g., emulation-based designs that span multiple FPGA devices). The sheer size of the designs can make successful implementation difficult and can lengthen the design turnaround time (e.g., due to the long design flow runtimes). It has been recognized that certain (e.g., emulation-based) designs suffer from congestion issues within the CLB logic. The congestion can lead to long runtimes in the implementation tool flow (e.g., due to routing difficulties). Further, design flow process may result in a sacrifice of speed to be sure that the design routes properly (e.g., using slower routing solutions to decrease congestion). The result can be slower performance of the design and a correspondingly reduced operational frequency. Aspect described in the present disclosure can be useful for reducing routing congestion in certain contexts and designs.

Consistent with various implementations of the preset disclosure, the multiplexer identification and transformation can work efficiently with many clock-groups (e.g., some architectures can have 30-40 clock groups in a design, and even more groups are possible).

Design flows consistent with various implementations allow for the multiplexers to be identified and transformed substantially independent of the content of the design because the process used to identify the multiplexers does not depend upon the specifics of how the design specifies that the programmable logic is configured. In other words, the same basic process can be used for different configurations of the programmable logic. Similarly, the multiplexer identification and transformation can be implemented independent from other design flow optimizations and processes, such as a specific algorithm for fan-out optimization. Further, various implementations allow for the multiplexer identification and transformation to be carried out without requiring manual input from a user of the PLD design tool.

Turning now to the figures, FIG. 1 is a flow diagram that shows a design flow, consistent with implementations of the present disclosure. The design flow can be carried out using one or more computer processor circuits that execute instructions for a PLD/FPGA design tool, sometimes also referred to as an electronic design automation (EDA) tool. The design tool can receive or access the design file(s) 102.

Consistent with the implementations discussed herein, the design file 102 can correspond to an emulation-based design that is to be implemented within several PLDs. For ease of discussion, various examples are mentioned in the context of an emulation-based design. The different implementations are not limited to emulation-based designs. Rather, design file 102 can correspond to other design types of varying sizes.

The design file can be processed by the PLD design tool resulting in a set of CLB hardware/dedicated multiplexers 104. For example, the PLD design tool can synthesize the design to create a netlist file. The netlist file can be used to map the logic to PLD elements (e.g., within CLBs or IOBs). The mapped PLD elements can include the CLB multiplexers 104. The mapping can include providing logical definitions for input, output, and control signals to the CLB multiplexers 104.

The PLD design tool can identify a first subset of multiplexers 106 from the plurality of hardware multiplexers based upon an analysis of the definitions. In particular, the PLD design tool identifies multiplexers 106 based upon how the input signals (selection signals or data signals) of the plurality of multiplexers are defined. As a non-limiting example, the input signals can be used to determine whether or not the LUT circuit providing the input to the multiplexer is serving as a pass-through of input data signals. In particular, the PLD design tool can determine whether or not the LUT circuit includes functionality that would modify the received data (as opposed to passing the data through unchanged). If the LUT circuit is a pass-through, then the corresponding multiplexer can be identified for placement into a first subset 106.

The PLD design tool transforms multiplexers from the first subset 106 into LUT logic 112. The transformation allows the corresponding LUT logic to be placed in an LUT circuit of a different CLB. Routing congestion can thereby be improved because the selection signals that drove the mux are routed to the different CLB and no longer need to be routed to the original CLB.

Optionally, the PLD design tool can merge or consolidate the LUT logic 112 to generate sets of LUT logic 114. The merging allows the functional logic of several multiplexers from LUT logic 112 to be placed within a single LUT circuit. The PLD design tool can then generate configuration data 116 (e.g., in the form of a bitstream) for programming the PLD in accordance with the LUT logic 114. The merging (consolidation) of the LUT logic can help counteract the additional CLB usage resulting from the transformation.

According to some implementations, the PLD design tool identifies a second multiplexer subset 108. For example, the transformation can result in the signal path being routed through one or more additional CLBs, which can add signal delay. Accordingly, the PLD design tool may check the timing constraints for data paths passing through the remaining multiplexers (those multiplexers not already identified as part of the first subset 106). The PLD design tool can identify multiplexers that have no paths with timing constraints. Adding delays to the corresponding paths will therefore not violate the design timing constraints because there are no timing constraints for the paths. The identified multiplexers form the second subset of multiplexers 108. The PLD design tool transforms multiplexers from the second subset 108 into LUT logic 112.

Consistent with certain implementations, the PLD design tool identifies a third multiplexer subset 110. The PLD design tool analyzes the remaining multiplexers by comparing the timing constraints against predicted timing for paths passing through the multiplexers. The difference between the timing constraints and the predicted timing is sometimes referred to as timing slack, or just slack. A negative slack value indicates that the corresponding timing constraint is not being met for the path. A positive slack value indicates there is a buffer between the predicted timing and the timing constraint (e.g., some delay can be added without violating the constraint). While the PLD design tool can attempt to improve timing for negative slack values, transforming the multiplexers into LUT logic 112 tends to add timing delays (e.g., due to delays caused by routing through an additional CLB). Depending upon the desired aggressiveness for identifying multiplexers, the PLD design tool can use a threshold slack value to identify the third subset of multiplexers 110. As a non-limiting example, the threshold could be set a zero so that multiplexers with a negative slack value would not be transformed into LUT logic 112 and multiplexers with a positive slack value would be identified for transformation.

Figure 2:
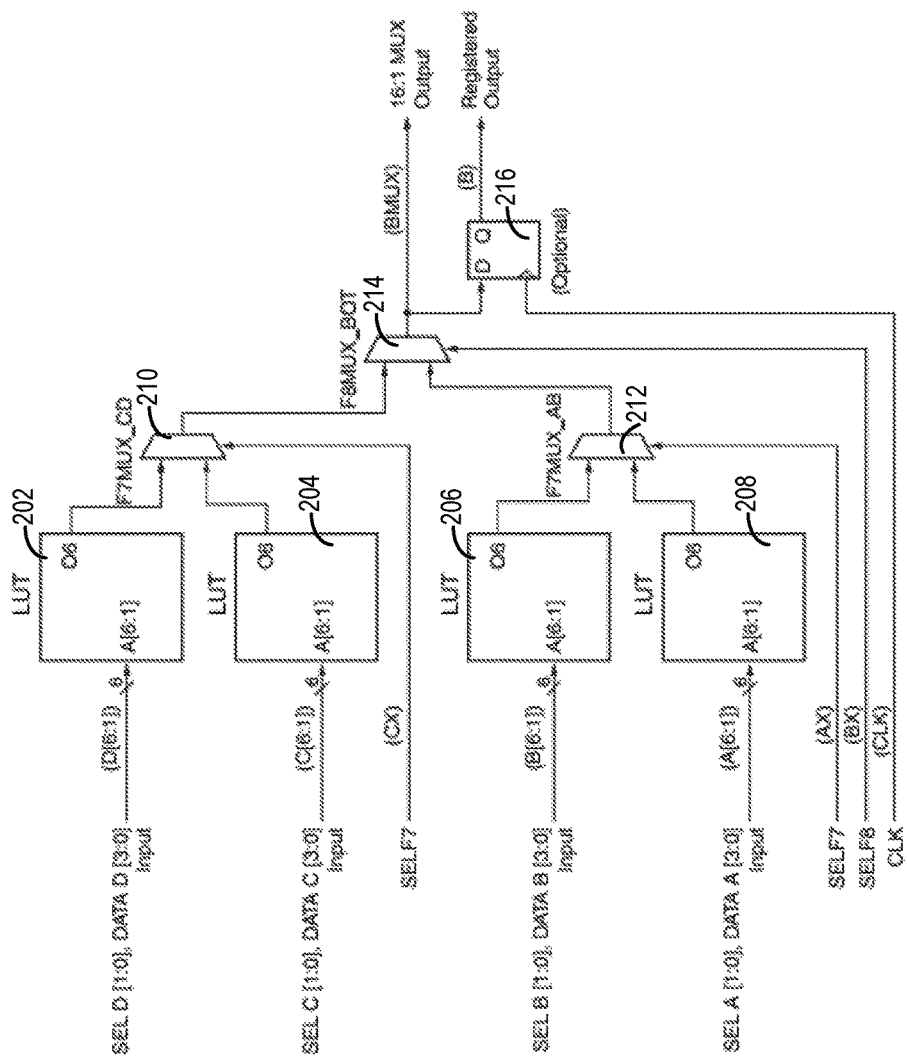
FIG. 2 is a block diagram showing a portion of a CLB that can function as a 16:1 multiplexer, consistent with implementations of the present disclosure.

FIG. 2 is a block diagram showing a portion of a CLB that can function as a 16:1 multiplexer, consistent with implementations of the present disclosure. The particular configuration of FIG. 2 is provided as an example and is not meant to be limiting. Moreover, various additional elements, routing solutions and functional logic can be found within a CLB, as is consistent with the various implementations discussed herein. The omission of details for such additional CLB features is for the sake of clarity and is not meant to be limiting.

The depicted CLB includes four LUT blocks 202, 204, 206, and 208. Each LUT block is shown as being a six input (6:1) LUT circuit with a single output (O6) and can be implemented using memory circuitry that stores the output values for each combination of input values. The inputs to each LUT block are labelled with a corresponding letter (202→D, 204→C, 206→B, and 208→A). Consistent with the discussion herein, the LUT blocks 202, 204, 206, and 208 can be configured to operate as 4-to-1 (4:1) multiplexers. This is represented in the figure by the four data values [3:0] and the two selection values [1:0], which collectively form an address to the LUT blocks. The PLD design tool can configure the stored LUT values to be consistent with the functionality of a 4:1 multiplexer.

The output data paths A and B are routable to a multiplexer 212 (F7MUX_AB) and the output data paths C and D are routable to another multiplexer 210 (F7MUX_AB). Here, "F7" refers to the ability to generate any function of seven inputs, while the addition of the F8MUX provides the capability of generating any function of eight inputs. In connection with the LUT blocks, the "F7" multiplexers can be used to provide an 8:1 multiplexer functionality. For example, FUMUX_AB selects between eight input data signals (A[6:1] and B[6:1]) in response to three sets selection/control signals (SEL A[1:0], SEL B[1:0], and SELF7).

Consistent with various implementations, the (F7, F8, etc.) multiplexers can be implemented using dedicated hardware multiplexers (e.g., dedicated transistor-level logic that does not require LUTs within memory circuits to provide multiplexer functionality). The multiplexer and signal naming conventions are provided as examples and are not meant to be limiting. Further, the particular configuration of the multiplexers can be varied according to the system or PLD architecture. For instance, there could be multiple multiplexer structures within each CLB. The additional structures could be referred to as F7MUX_CD, F7MUX_EF and there can be similar naming for the corresponding and additional F8 multiplexers and control signals.

The outputs of the F7 multiplexers can be provided to another multiplexer level that includes multiplexer 214 (F8MUX_BOT). The additional layer allows for a 16:1 multiplexer function that is responsive to an additional control signal (SELF8).

Optionally, data signal provided from any level of the multiplexers can be latched or registered using one or more registers 216. Although not expressly depicted, the CLB can include routing options that allow the data signals to be routed to external routing logic. This allows the data signals to be routed to other CLBs and to other parts of the PLD without passing through the additional multiplexer levels.

Consistent with various implementations, the PLD design tool can identify one or more of multiplexers 210, 212, and 214 for transformation. As discussed herein, the identification can be based upon several factors. A first factor can be the connectivity of the multiplexers relative to their respective inputs. The output of LUT blocks 202-208 drive the input of the first level of multiplexers 210 and 212. Accordingly, when the PLD design tool wishes to use one of the multiplexers 210 and 212 the corresponding input data signals are first routed through the LUT blocks 202-208. The PLD design tool identifies this condition by checking for input data signals that pass through the LUT blocks without the LUT block being used to provide additional logic (referred to as a "pass-through" condition).

A second factor relates to the presence or absence of timing constraints on data paths passing through the multiplexers. For example, the PLD design tool can check the design file to determine if input and output data signals of multiplexer 210 have been assigned any timing constraints. If not, then the PLD design tool can identify the multiplexer 210 as part of a subset that will later be transformed into LUT logic.

A third factor uses the predicted timing of signals relative to existing timing constraints on data paths passing through the multiplexers. The PLD design tool can identify multiplexers that have timing constraints, but that have sufficient slack relative to the timing constraints. The identified multiplexers can then be transformed into LUT logic.

Figure 3:
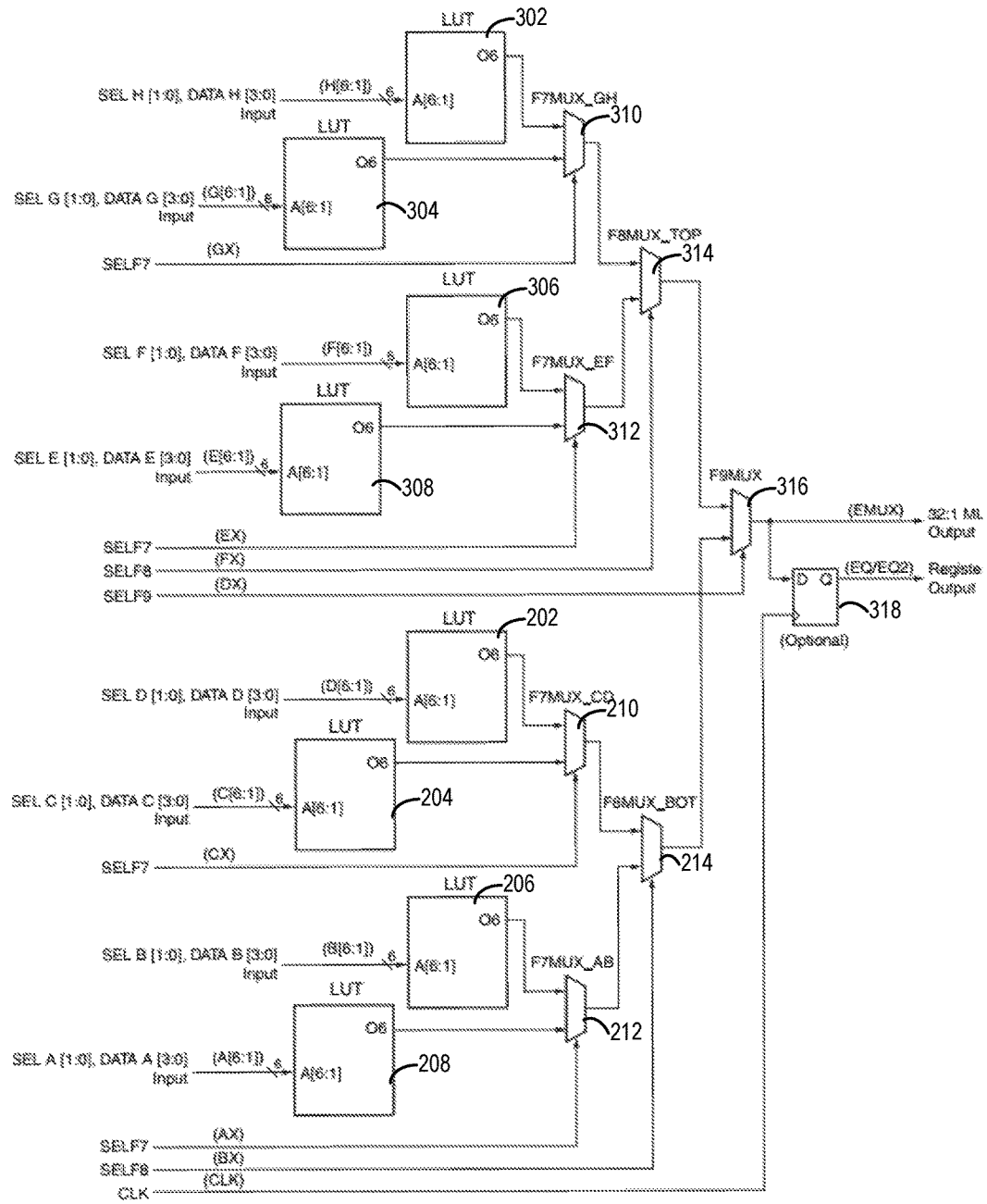
FIG. 3 is a block diagram for a portion of a CLB that can function as a 32:1 multiplexer, consistent with implementations of the present disclosure.

FIG. 3 is a block diagram for a portion of a CLB that can function as a 32:1 multiplexer, consistent with implementations of the present disclosure. The blocks 202-214 are consistent with the corresponding description from FIG. 2. These blocks provide the bottom portion of the CLB and are substantially replicated by blocks 302-314, which provide the upper/top portion of the CLB. The functionality of similarly numbered elements (e.g., 202→302, and 204→304) is largely identical. A detailed discussion of the similar functionality is not repeated for the sake of brevity. The depicted CLB includes an additional multiplexer layer that includes the multiplexer 316 (F9MUX). Multiplexer 316 is controlled by an additional control signal (SELF9). The output of multiplexer 316 can (optionally) be stored in register 318.

As discussed herein, the PLD design tool can identify multiplexers for inclusion in a subset based upon a characterization of the connectivity for the input signals of the multiplexers. Consistent with particular implementations, the PLD design tool can begin by identifying F7-level multiplexers that have pass-through inputs. The F7-level multiplexers are the transformed into LUT logic. The PLD design tool can next identify F8-level multiplexers that are no longer driven by F7-level multiplexers (due to F7-level multiplexers already have been identified and transformed/removed). The identified F-8 level multiplexers are then transformed in to LUT logic. The PLD design tool next identifies F9-level multiplexers that are no longer driven by F8-level multiplexers and transforms the identified F9-level multiplexers into LUT logic.

Figure 4:
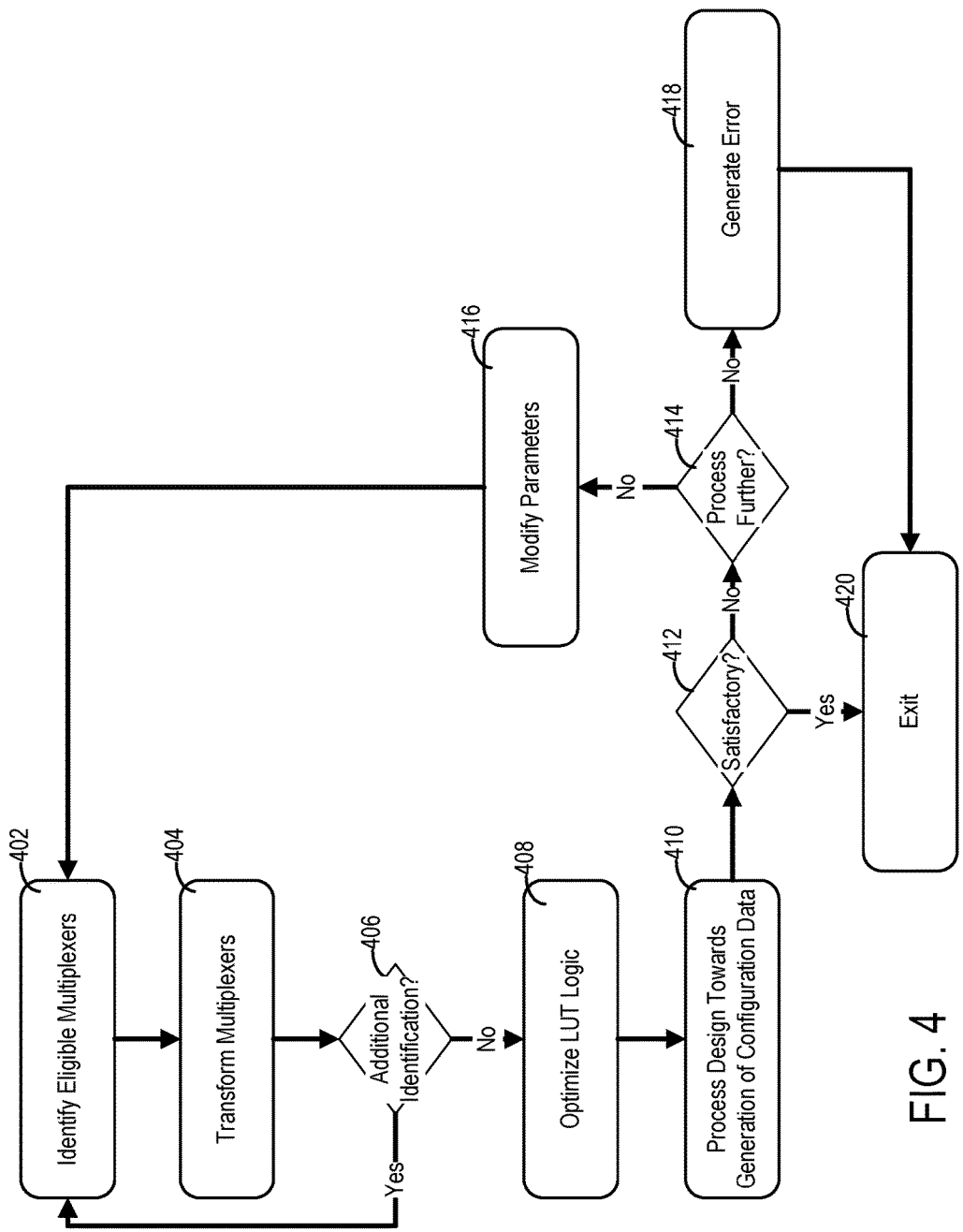
FIG. 4 is a flow diagram showing a design flow in which multiplexers are identified and transformed, consistent with implementations of the present disclosure.

FIG. 4 is a flow diagram showing a design flow in which multiplexers are identified and transformed, consistent with implementations of the present disclosure. The flow begins by identifying eligible multiplexers, per block 402. As discussed herein, the first identification can be for a first level of multiplexers and relative to their input connectivity. In particular, a subset of multiplexers can be identified based upon whether or not the input signals of the multiplexers represent a pass-through situation/condition for a corresponding LUT block. The PLD design tool can identify the pass-through condition based upon design definitions for input signals. The design definitions can specify that the input signals are driven by a remote source, relative to the CLB containing the multiplexer. This would normally result in the PLD design tool first routing the input signals through the LUT blocks within the same CLB and without further functional modification of the signals by the LUT blocks. In some instances, the PLD design tool identifies the pass-through situation at a point in the design flow before the LUTs have been added to the design. For example, the PLD design tool can operate on a netlist that has not yet been mapped to elements of the target device. In other instances, the PLD design tool can identify the pass-through situation after the LUT blocks have been added (e.g., by analyzing the logic of the LUT blocks to identify pass-through situations). For instance, the PLD design tool can operate after the netlist has been mapped to the device resources, including the LUT blocks. The PLD design tool can look for a condition where both LUT blocks of a multiplexer always provide the value of a particular input on their output.

The PLD design tool next transforms the identified subset of multiplexers into corresponding LUT logic, per block 404. For example, two-input multiplexer logic can be represented by the logical expression: Out=(Input1∩Select)∪(Input2∩Select-Bar). This expression can be used to program LUT logic (e.g., using the corresponding truth table to define the LUT values to be stored in the LUT memory).

The PLD design tool also determines whether additional identification of multiplexer subsets is desired, per block 406. The iterations resulting from a positive determination can correspond to a progression through multiple levels of multiplexers (F7→F8→F9) as well as the use of multiple factors (e.g., timing constraints and slack). Each additional subset that is identified is also transformed into LUT logic by the PLD design tool.

According to various implementations, the PLD may have a configuration and architecture for the multiplexer structures that differs from the examples expressly shown herein. For instance, different sizes of input functions could be implemented using hardware multiplexers driven by LUT blocks (e.g., F5 or F6). Consistent with certain aspects of the present disclosure, the PLD design tool allows for multiplexer optimization to be implemented in a manner that is relatively independent of the particular architecture. For example, the PLD architecture might not include multiple levels of multiplexers configured to be able to provide functions for varying numbers of inputs (e.g., F7-F9). For such an architecture, the PLD design tool may be configured to perform a single identification iteration across all multiplexers to create a first subset of multiplexers. Additional multiplexer subsets could then be identified relative to factors other than the multiplexer level, such as by using timing constraints or slack as the factors.

The PLD design tool (optionally) optimizes or restructures the transformed LUT logic generated for the identified multiplexers, per block 408. The optimization can include merging (consolidating) the logic for multiple multiplexers into LUT logic within the same LUT block. For example, the PLD design tool might use a technique based upon a binary decision diagram (bdd) to create larger LUT logic within the LUT blocks. Restructuring of the LUT logic into shared LUT blocks can be particularly useful for reduced complexity in placement and also reduction in wire count.

The PLD design tool can then continue processing the design toward the eventual generation of configuration data (e.g., a bitstream), per block 410. Additional steps in the processing can include mapping, placement, routing, and bitstream generation. The PLD design tool can verify whether the design is satisfactory, per block 412. In particular implementations, the PLD design tool can verify the design at several different points during the design flow. In response to a successful, or satisfactory, design flow, the PLD design tool can exit the flow, per block 420.

If not successful (e.g., due to failure to meet timing constraints, to properly perform placement within the design constraints, or to properly route), the PLD design tool can determine whether further processing is desired, per block 414. For example, the decision at block 414 might be based upon a maximum number of iterations that was specified when the design flow began, a maximum run time, or a lack of sufficient improvement between subsequent iterations. If no further processing is desired, the PLD design tool can generate an error, per block 418, and then exit the design flow, per block 420. If further processing is desired, the PLD design tool can change various parameters of the design flow, per block 416. While any number of different parameters can be changed, some of the parameters may modify how the multiplexers are identified in block 402. For example, the PLD design tool can change the slack threshold value that determines the corresponding multiplexer subset. For example, the PLD design tool can more aggressively identify multiplexers for transformation (e.g., by reducing the slack value threshold). If the design flow does not result in a satisfactory output and no further processing is desired, then the design flow has failed and an error message can be generated per block 418. For example, the PLD design tool might detect that there are timing issues or routing issues, per block 412, while also determining that a maximum number of design flow iterations has been met, per block 418.

The design flows discussed herein, including those consistent with FIG. 4, can be particularly useful for compensating for high congestion due to the potentially problematic parts of an emulation design and flow. For example, the compensation for congestion can reduce complexity of the routing process, which can lead to reduced runtime, improved quality of routing (QoR), and less routing congestion issues. Various implementations use a dynamic approach in which the PLD design tool identifies multiplexers at different stages of the design flow (e.g., dynamically adjusting the design flow in response to timing inaccuracy caused by correlation between the stages).

Figure 5:
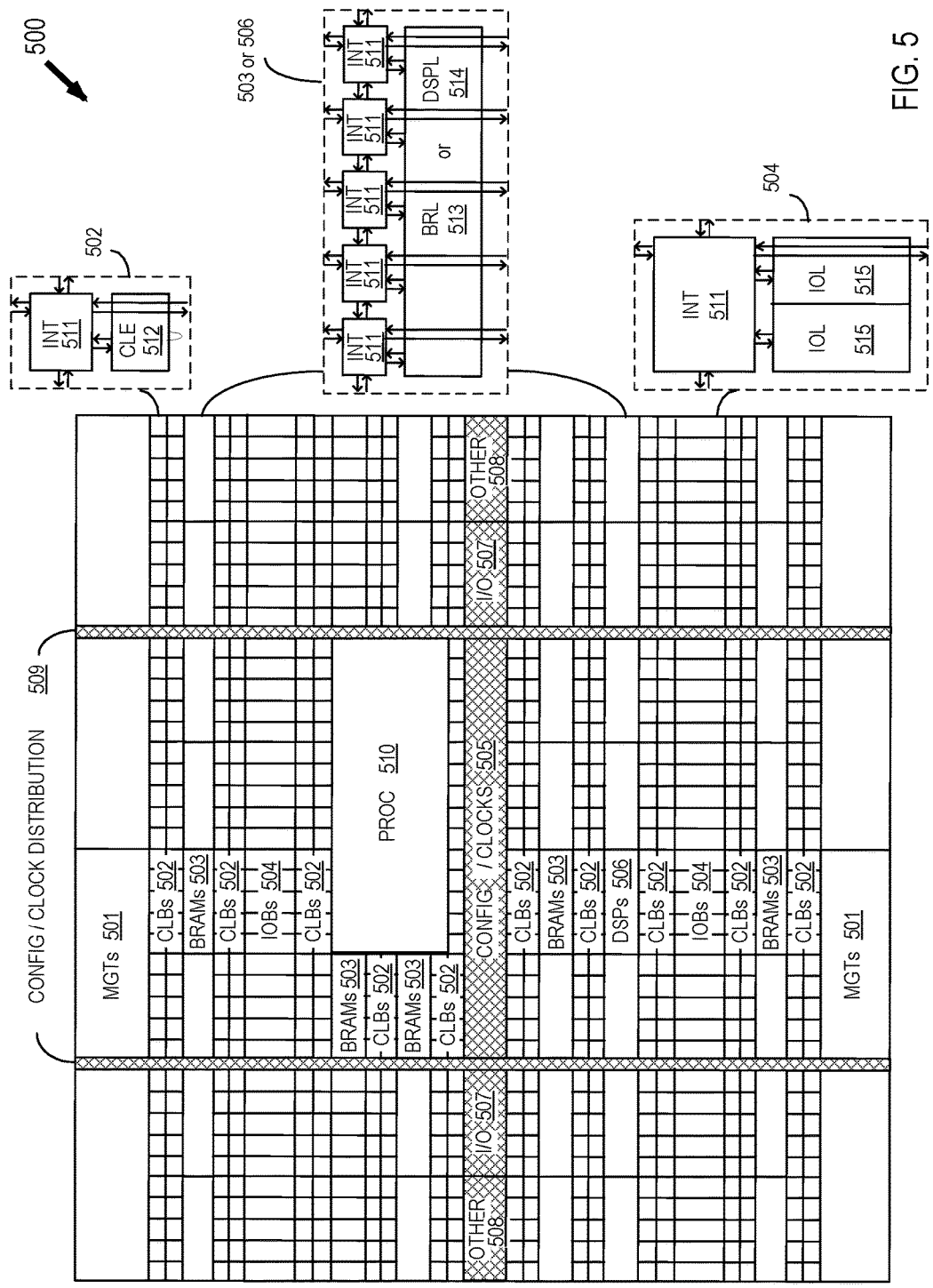
FIG. 5 shows a programmable integrated circuit (IC) 500 on which the disclosed circuits and processes may be implemented.

FIG. 5 shows a programmable integrated circuit (IC) 500 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. In the pictured implementation, a BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and need not be confined to the area of the input/output logic element 515. The states of configuration memory cells (not shown) of the programmable IC specify the logic implemented by the CLEs 512, the interconnections of the INTs 511, and configurations of the IOLs 515.

In the pictured implementation, a columnar area near the center of the die (shown shaded in FIG. 5) is used for configuration, clock, and other control logic. Horizontal areas 509 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an example of programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are not intended to be limiting examples.

For example, in an actual programmable IC, more than one adjacent column of CLBs can often be included wherever the CLBs appear, to facilitate the efficient implementation of user logic.

Figure 6:
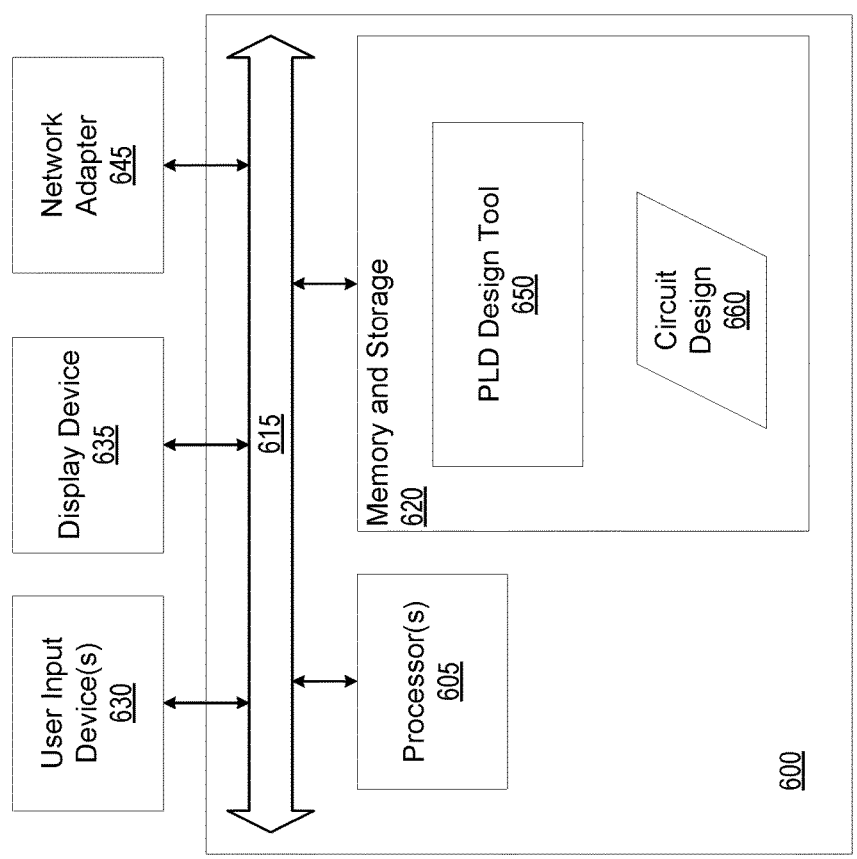
FIG. 6 is a block diagram illustrating a data processing system (system) 600, consistent with various implementations of the present disclosure.

FIG. 6 is a block diagram illustrating a data processing system (system) 600, consistent with various implementations of the present disclosure. As pictured, system 600 includes at least one processor circuit (or "processor"), e.g., a central processing unit (CPU) 605 coupled to memory and storage arrangement 620 through a system bus 615 or other suitable circuitry. System 600 stores program code and circuit design 660 within memory and storage arrangement 620. Processor 605 executes the program code accessed from the memory and storage arrangement 620 via system bus 615. In one aspect, system 600 is implemented as a computer that is suitable for storing and/or executing program code. It should be appreciated, however, that system 600 can be implemented in the form of any system including a processing circuit and memory circuitry that is capable of performing the functions described within this disclosure.

Memory and storage arrangement 620 includes one or more physical memory devices such as, for example, a local memory circuit (not shown) and a persistent storage device (not shown). Local memory can include random access memory or other non-persistent memory circuitry and device(s) generally used during actual execution of the program code. Persistent storage can be implemented as a hard disk drive (HDD), a solid state drive (SSD), or other persistent data storage device. System 600 may also include one or more cache memories (not shown) that provide temporary storage of at least some program code and data in order to reduce the number of times program code and data must be retrieved from local memory and persistent storage during execution.

Input/output (I/O) devices such as user input device(s) 630 and a display device 635 may be optionally coupled to system 600. The I/O devices may be coupled to system 600 either directly or through intervening I/O controllers. A network adapter 645 also can be coupled to system 600 in order to couple system 600 to other systems, computer systems, remote printers, and/or remote storage devices through intervening private or public networks. Modems, cable modems, Ethernet cards, and wireless transceivers are examples of different types of network adapter 645 that can be used with system 600.

Memory and storage arrangement 620 may store a PLD design tool application (or "EDA tool") 650. PLD design tool application 650, being implemented in the form of executable program code, is executed by processor(s) 605. As such, PLD design tool application 650 is considered part of system 600. PLD design tool application 650, circuit design 660, and any data items used, generated, and/or operated upon by PLD design tool application 650 define the configuration and functionality of system 600 when employed as part of system 600.

System 600, while executing PLD design tool application 650, receives and operates on circuit design 660. In one aspect, system 600 performs a design flow on circuit design 660, and the design flow may include synthesis, mapping, placement, routing, and the application of one or more physical optimization techniques as described herein. System 600 generates an optimized, or modified, version of circuit design 660 (e.g., as either as a final bitstream or design files for intermediate stages of the design flow). The bitstream can be loaded into an IC such as a programmable IC causing implementation and/or configuration of a circuit design within the programmable IC.

For the various flow diagrams depicted herein, the particular orders of the blocks and associated functions are provided as examples. The ordering is not necessarily limiting and can be varied according to various implementations.

Those skilled in the art will appreciate that various alternative computing arrangements, including one or more processors and a memory arrangement configured with program code, would be suitable for hosting the processes and data structures that may carry out functions disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use RAM circuits. Other aspects and features will be apparent to those skilled in the art from consideration of the specification. The portions of the methods and system may be implemented as one or more processors configured to execute software, as an application specific integrated circuit (ASIC), or as a logic on a programmable logic device. Moreover, the various circuits identified herein may share hardware circuitry, such as use of a common computer processing unit or digital processing unit. It is intended that the specification and drawings be considered as examples only, with a true scope of the invention being indicated by the following claims.

What is claimed is:

1. A method for generating a programmable logic design for a programmable logic device (PLD) containing configurable logic blocks (CLBs) each having a plurality of multiplexers and look-up-table (LUT) circuits, the method comprising:
    identifying in a circuit design having logic mapped to circuit elements of the PLD, a first subset of multiplexers from the plurality of multiplexers based upon design definitions for input signals of the plurality of multiplexers indicating that the input signals pass unchanged through LUT circuits to inputs of the first subset of multiplexers;
    transforming the first subset of multiplexers into LUT logic; and
    generating configuration data designed to be loaded into the PLD to configure the CLBs to implement the LUT logic.

2. The method of claim 1, further comprising:
    identifying a second subset of multiplexers from the plurality of multiplexers based upon an analysis of timing constraints for the plurality of multiplexers; and
    transforming the second subset of multiplexers into LUT logic that is specified in the configuration data.

3. The method of claim 2, wherein the analysis of timing constraints includes a comparison of timing constraints to a threshold level, and
    further comprising adjusting the threshold level in response to an error in generating the configuration data.

4. The method of claim 2, further comprising:
    identifying a third subset of multiplexers from the plurality of multiplexers based upon an analysis of timing slacks for the plurality of multiplexers; and
    transforming the third subset of multiplexers into LUT logic that is specified in the configuration data.

5. The method of claim 4, wherein the analysis of timing slacks includes a comparison of the timing slacks to a threshold level, and
    further comprising adjusting the threshold level in response to an error in generating the configuration data.

6. The method of claim 1, further comprising consolidating LUT logic for multiple multiplexers into individual LUT circuits.

7. The method of claim 6, wherein the consolidating includes using a binary decision diagram (bdd) to create larger LUT logic within the LUT circuits.

8. The method of claim 1, wherein the LUT circuits in the CLBs are configured to provide inputs to multiple levels of multiplexers of the plurality of multiplexers; and
    wherein identifying the first subset of multiplexers includes identifying multiplexers from each of the multiple levels in succession.

9. The method of claim 1, wherein identifying the first subset of multiplexers includes determining that input signals of each multiplexer of the first subset do not rely upon logic of LUT circuits of a corresponding CLB.

10. A system for generating a programmable logic design for a programmable logic device (PLD) containing configurable logic blocks (CLBs) each having a plurality of multiplexers and look-up-table (LUT) circuits, the system comprising:
    a processor; and
    a memory arrangement coupled to the processor, wherein the memory arrangement is configured with instructions that, when executed by the processor, cause the processor to perform operations including:
        identifying in a circuit design having logic mapped to circuit elements of the PLD, a first subset of multiplexers from the plurality of multiplexers based upon an analysis of design definitions for input signals of the plurality of multiplexers indicating that the input signals pass unchanged through LUT circuits to inputs of the first subset of multiplexers;
        transforming the first subset of multiplexers into LUT logic; and
        generating configuration data designed to be loaded into the PLD to configure the CLBs to implement the LUT logic.

11. The system of claim 10, wherein the operations further include:
    identifying a second subset of multiplexers from the plurality of multiplexers based upon an analysis of timing constraints for the plurality of multiplexers; and
    transforming the second subset of multiplexers into LUT logic that is specified in the configuration data.

12. The system of claim 11, wherein the analysis of timing constraints includes a comparison of timing constraints to a threshold level, and
    wherein the operations further include adjusting the threshold level in response to an error in generating the configuration data.

13. The system of claim 11, wherein the operations further include:
    identifying a third subset of multiplexers from the plurality of multiplexers based upon an analysis of timing slacks for the plurality of multiplexers; and
    transforming the third subset of multiplexers into LUT logic that is specified in the configuration data.

14. The system of claim 13, wherein the analysis of timing slacks includes a comparison of the timing slacks to a threshold level, and
   wherein the operations further include adjusting the threshold level in response to an error in generating the configuration data.

15. The system of claim 11, wherein the system is configured to identify the second subset of multiplexers after mapping a netlist to PLD resources.

16. The system of claim 10, wherein the operations further include consolidating LUT logic for multiple multiplexers into individual LUT circuits.

17. The system of claim 16, wherein the consolidating includes using a binary decision diagram (bdd) to create larger LUT logic within the LUT circuits.

18. The system of claim 10, wherein the LUT circuits in the CLBs are configured to provide inputs to multiple levels of multiplexers of the plurality of multiplexers; and
   wherein identifying of the first subset of multiplexers includes identifying multiplexers from each of the multiple levels in succession.

19. The system of claim 10, wherein the system is configured to identify the first subset of multiplexers before mapping a netlist to PLD resources.

20. The system of claim 10, wherein the system is configured to identify the first subset of multiplexers after mapping a netlist to PLD resources by analyzing logic of corresponding LUT circuits.

* * * * *